May 27, 1958     H. H. MORRIS     2,836,529
REINFORCED PLASTIC
Filed May 3, 1954
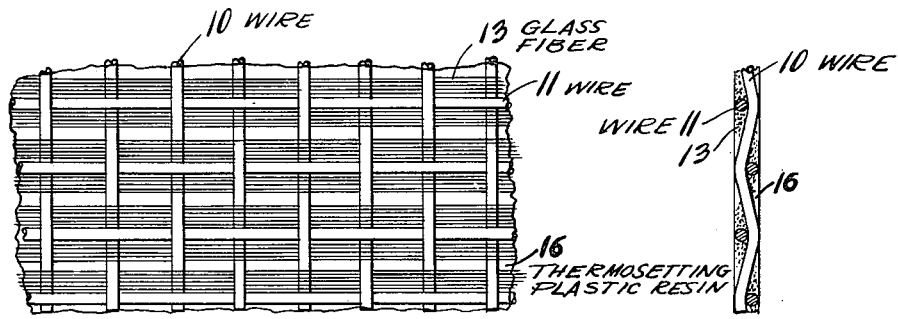
FIG-1-     FIG-2-
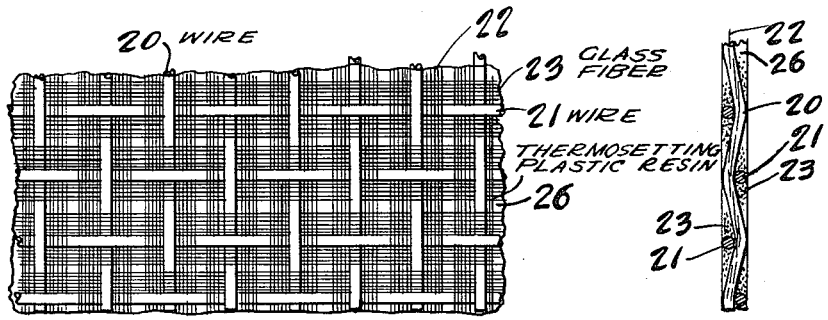
FIG-3-     FIG-4-
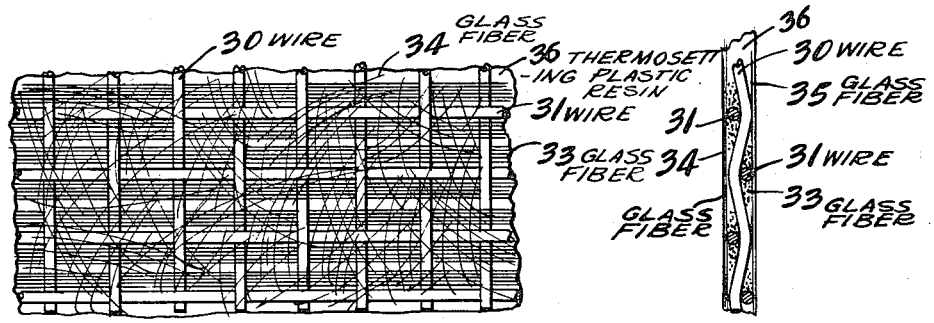
FIG-5-     FIG-6-
INVENTOR:
HAROLD H. MORRIS.
BY
ATTY.

United States Patent Office 2,836,529
Patented May 27, 1958

2,836,529

REINFORCED PLASTIC

Harold H. Morris, Chicago, Ill., assignor of one-tenth to Hugh Adam Kirk, Toledo, Ohio Application May 3, 1954, Serial No. 427,258

10 Claims. (Cl. 154—53)

This invention relates to a reinforced organic type plastic. More particularly, it deals with such a plastic in which reinforcing longitudinal materials, such as for example glass fibers and metal wires, are embedded and stressed to increase the stiffness of the product.

It is an object of this invention to produce a simple, efficient, effective and economic reinforced plastic which has increased stiffness and strength over previously known similar plastic products.

Another object is to produce a reinforced plastic which may have uniform strength in all directions or may vary in strength in different directions depending upon the use for which it is to be put.

Another object is to produce a reinforced plastic which may be formed in conventional metal and/or plastic molds or dies.

Another object is to produce a reinforced plastic sheeting which may be easily joined together along its edges without producing a weakened place in the surface at the joint.

Another object is to produce a reinforced plastic which approaches the properties of steel for stiffness and flexibility and may be used in forming automobile truck and trailer bodies, and the like, and may readily be repaired in situ.

Another object is to produce a reinforced plastic which need not be molded and may be formed in situ on any preshaped reinforcing base.

Another object is to produce a reinforced plastic which may have any type of smooth, grained, or corrugated surface, and which may be dyed substantially any color.

Generally speaking, the reinforced plastic of this invention comprises a polymerized thermosetting plastic resin in which are embedded at least two types of reinforcing longitudinal or filature materials, one of which has a relatively high thermal coefficient of expansion with respect to the other, and which resin contracts on polymerization under heat, while the reinforcing longitudinal materials are expanded, to grab the reinforcing materials and maintain them under internal tension or stress after the polymerization has been completed and the composition has cooled to form a rigid final product.

The reinforcing longitudinal materials include metal bars or wires and fibrous materials. The metallic materials are generally considered those having the higher coefficients of thermal expansion and may include iron, steel, copper, nickel, aluminum, brass, metal alloys, or the like, in the form of short or long fibers and/or wire at random, or woven into a screen, gauze or fabric material. Such forms are particularly advantageous if a sheet reinforced resinous product is to be formed. The reinforcing longitudinal metal materials may also include metal strips, bands, tapes, sleeves, rings, rods and the like, depending entirely upon the directions of the stresses to which the product is to be subjected in use. In fact the rods and wires may even be prestressed or tensioned above that which naturally occurs due to expansion at the temperature of polymerization of the resin in which they are embedded.

The other reinforcing longitudinal fibrous materials should likewise be resistant to the heat of polymerization of the resin, and for a stiffer product should have high tensile strength, and may include glass fibers, slag wool, asbestos fibers, wood cellulose fibers, hemp, jute, ramie, kapok, sisal, flax, cotton, silk, hair, nylon, viscose rayons, other synthetic fibers, or the like, in the form of chopped random short fibers, mats, rovings, yarns, strands, filaments, fabrics, cloth, or the like.

Both types of reinforcing longitudinal materials may be interspersed, mixed or interwoven, such as wire with glass fiber yarn on a loom, or alternate layers of metal screen mesh and woven cloth or fibers, to produce a cloth or reinforcing base. The type weaving employed may be ordinary weaving or tabby, twill, or satin, depending upon the finish and the strength of the reinforcing material required. If the product is to be formed in a conventional sheet metal type die or mold or preforming machine with curves and reverse bends, it is desirable that the warp and/or woof threads be spaced to permit more flexibility. This construction can also be used to advantage in existing preform machines employed in the glass fiber molding industry. Since all conventional preforms produced on existing preform machinery use fibers which have random orientation, unnecessary thickness has to be used in order to compensate for specific directional stresses. However, if a preform, comprising reinforcing longitudinal metallic materials interspersed with non-metallic fibers by the previously mentioned weaving process be employed and then sprayed and coated with additional fibrous material in conventional preform machinery, the whole can then be placed in or on a die or form with assurance of maximum fiber content in the direction to counteract specific stresses on polymerization. One or both of the surfaces of the reinforcing longitudinal material base, before and/or after the forming may be sprayed with random short fibers or covered with a cloth or mats which also may be embedded in and/or polymerized with the resin surrounding the reinforcing materials. This polymerization may be carried out in a conventional plastic type mold or die employing heat and/or pressure, including the pressure or vacuum type bag molding processes.

The plastic resinous material in which the reinforcing longitudinal materials are embedded is of a thermosetting type, in which the polymerization reaction requires heat or gives off heat which expands the metallic longitudinal materials more than the other reinforcing materials and locks the longitudinal strands before they are cooled to put them under stress when cooled, internally stressing the final polymerized product. The glass or other flexible fibers are primarily employed with the resin to stiffen and give structural strength to the resin, so it will not collapse under the internal stresses placed on the metal wires embedded in the products as well as to stiffen the whole product.

Some examples of thermosetting type resins which may be employed include: polyester or glycerol-polybasic acid resins, epoxy resins, phenolic resins, phenol-aldehyde resins, furan resins, urea formaldehyde resins, melamine resins, acetylene and poly-olefin resins, silicone resins, and the like. These resins may be powders but preferably are employed in liquid form or in solution before polymerization so that they may be sprayed, painted, dipped, brushed or otherwise applied on to the reinforcing materials. Also the reinforcing fibers may be coated with the resin so that when they are woven together the product only needs to be heated to be polymerized to form a unit plastic product.

In the case of polyester type resins, the ingredients forming them, such as the polyhydric alcohols, an unsaturated organic acid, such as fumaric and maleic, and possibly a modifying acid such as adipic acid to produce flexibility if desired, are preferably mixed with a suitable unsaturated hydro-carbon monomer, such as styrene, to increase the rigidity of the product. Other suitable monomers are methyl methacrylate, ethyl acrylate, acrylonitrile, vinyl acetate, diallyl phthalate, triallyl cumerate, vinyl phenol, diallyl maleate, and the like.

Depending upon the stability of the resin employed before polymerization, there may have to be added to it suitable stabilizers such as tertiary butyl catechol, and/or accelerators, such as dimethylamine, cobalt naphthenate, tertiary butyl perbenzoate, or benzoyl peroxide.

To the resin may also be added color pigments, fire resistant materials such as chlorine compounds or antimony oxide, and inorganic binders or fillers such as mica, chalk, or some thixotropic material when a liquid resin is applied to a vertical surface.

An important problem in producing a good reinforced plastic according to this invention, includes that of the cohesion of the reinforcing materials with the resin and vice versa. If synthetic fibers or glass fibers are employed they are usually coated with some sort of sizing material, such as starch and/or oil which prevents good adhesion between the resin and the fibers. These materials may be removed either by heating in an inert atmosphere up to about 300° C., dissolving or neutralizing the sizing coating, or else providing a special type of sizing coating such as vinyl chlorosilane for glass fibers, polyvinyl acetate, methacrylato chromic chloride, or the like.

Regarding the metal reinforcing wires, the same problem also exists, however, if aluminum wires are employed, polyester resins may adhere well to them without a coating or sizing. It also may be necessary to use certain additives with the resin depending upon the catalyst, to counteract metallic contamination of the resin which may prevent polymerization.

The relative percentages of the plastic material to the solid reinforcing elongated materials may vary depending upon the use to which the product is to be put, however, a general ratio of about 50% of each by volume may well be tolerated and produces a strong and stiff plastic. Considering the glass fibers and resin as a unit, apart from the wire and metal reinforcing material, the percentage of glass to resin varies between about 50% glass to 50% by volume for most intense purposes and about 25% glass to 75% resin, respectively, in that about 25% by volume of glass fibers is necessary to strengthen the resin against the internal stresses of the wires in the product. The metal reinforcing materials alone in the plastic may vary by volume from as low as above 5% up to about 50% of the entire composition, with the glass and resin making up the remaining proportion.

In polymerizing the resinous material on or around the reinforcing materials, heat and/or catalysts may be employed. If outside heat cannot be easily applied, a peroxide catalyst such as benzoyl peroxide, chloro benzoyl peroxide, methyl ethyl ketone peroxide, etc. may be employed to polymerize a polyester resin. Such peroxides permit, in the presence of an accelerator, the polymerization of the resin in situ without the employment of external heat and/or pressure, so that the plastic may be used in making the walls of large storage tanks by spraying the resin and catalyst onto a fabric netting frame. The heat of reaction during polymerization supplies the heat for the expansion of the metal reinforcing materials embedded in the plastic which are thereby placed under tension when cooled.

If external heat can be employed for polymerizing the resin after it has been coated on or has surrounded the reinforcing materials, temperatures up to about 300° C. for approximately ½ hour have been found sufficient for polymerizing polyester resins in the presence of less than 1% by weight of a peroxide catalyst. This external heating may be supplied by heated molds conventionally used in the industry, by radiant heaters, by high frequency dielectric or induction heaters, and/or by resistance electric heaters in which the metal reinforcing wires in the plastic are employed as the resistance heating elements.

In carrying out the polymerization of these thermosetting resins, it is not necessary that pressure also be applied, which is a tremendous advantage in forming the desired products in situ. However, if some external pressure is desired, the entire fabric may be wrapped or coated with cellophane or similar synthetic membrane material, which contracts on heating and accordingly applies its own pressure on the resin inside it. Such could be the case in producing cylindrical articles, such as barrels, pipes, ducts, and the like.

Because the composition of this invention is a polymerized plastic and such plastics decompose or loose their strength at their polymerization temperatures, the products produced preferably are employed at temperatures substantially below their corresponding polymerization temperatures, thereby maintaining the metallic reinforcing materials in the plastic continuously under stress or tension for retaining the increased strength of the product.

The thickness and/or the number of layers of plastic and reinforcing material may be increased as desired, depending upon the requirements of the products, with increased thicknesses at the edges or at the places of extra stress or strain. Also sheets of the reinforced plastic of this invention may be laminated with insulation mattings, honeycombed slabs, or molded with stiffeners, bubbles or corrugations to produce thermally insulated light weight panel boards for building construction, partitions, doors, etc.

If the reinforcing metal base material of a sheet plastic comprises a wire mesh fabric, joints may readily be made between the edges of similar sheets by employing wire clinchers along the adjacent edges of the meshes, which wire clinchers may then be embedded or sprayed with a compatible resin in which short reinforcing glass fibers may be suspended and the joint then polymerized in situ to form a unitary structure and integral strong joint, stronger than can be produced with bolts or rivets.

The above mentioned and other features and objects of this invention and the manner of attaining them are given more specific disclosure in the following description of embodiments of the invention taken in conjunction with the accompanying drawing wherein:

Fig. 1 is an enlarged side view of a portion of translucent sheet of a reinforced plastic in accordance with this invention incorporating interwoven wires with a woof or weft of glass fiber rovings or yarn;

Fig. 2 is an enlarged edge view of the sheet portion shown in Fig. 1;

Fig. 3 is a view of a portion of a translucent sheet of reinforced plastic similar to Fig. 1 showing the glass fiber rovings interwoven with both the warp and woof of the wire gabric;

Fig. 4 is an end or edge view of the sheet portion shown in Fig. 3;

Fig. 5 is a portion of a further reinforced plastic sheet similar to Fig. 1, with an additional layer of random fibers embedded in the plastic on each side of the interwoven reinforcing materials; and Fig. 6 is an end or edge view of the sheet portion shown in Fig. 5.

Referring to Figs. 1 and 2 a metal wire screen base of reinforcing warp wires 10 crossed by woof wires 11 in an ordinary tabby type weave includes also interspersed with the woof wires at least one glass fiber roving, yarn or thread 13 between each adjacent woof wires 11. These reinforcing materials are herein shown to be embedded or surrounded by a translucent polymerized thermosetting plastic resin 16. These glass fibers give an increased stiffness and tensile strength to the plastic sheet in the direction of the woof or weft.

Referring to Figs. 3 and 4, the warp reinforcing wires 20 interwoven with the woof wires 21 are both interspersed with glass fiber rovings, threads or yarns forming warp fibers 22 and woof fibers 23, all of which are similarly embedded in a sheet of translucent polymerized thermosetting plastic resin 26.

In Figs. 5 and 6 the same reinforcing fabric base mat shown in Fig. 1 having warp wires 30, woof wires 31 and interspaced woof fibers 33, has been coated or sprayed with additional short fibers 34 and 35 at random on each side of the sheet, all of which fibers and reinforcing materials are embedded in a translucent polymerized resin 36 giving an increased uniform strength to the sheet of Figs. 5 and 6. If desired the two way fiber reinforced base of Figs. 3 and 4, also may be coated with fibers 34 and/or 35 as shown in Figs. 5 and 6.

These woven reinforced base mats shown in the translucent plastic sections in the drawing may be produced on a loom, and thereafter may be coated with resinous material 16, 26 or 36 binding them together into reinforced plastic sheets. However, the glass or other lower thermal coefficient of expansion fibers 13, 22, 23, 33, 34 and/or 35 may be coated with resinous material 16, 26 or 36 and then only heat or an accelerator and/or a catalyst need to be applied to the sheeting to fuse and polymerize it into a unitary solid piece of material.

The following specific examples of sheets of reinforced plastic have been made according to this invention and found to have the following properties:

*Example 1.*—100 parts by volume of a commercial grade of a polyester resin was mixed with 10 parts by volume of styrene and 1 part by volume of benzoyl peroxide as a catalyst, and the resulting liquid mixture was coated over a prewoven reinforced fabric base of stainless steel wire mesh having 8 wires of approximately .028 inch diameter per inch and glass fiber roving sufficient to fill the apertures in the wire mesh similar to that shown in Figs. 3 and 4, and polymerized in an oven at a temperature of about 150° C. for about one half hour before being removed and cooled. The resulting rigid plastic product showed a tensile strength in excess of the sum total of the separate strengths anticipated for the ingredients therein and had a translucent or glass type finish which was relatively smooth and through which the reinforcing fabrics and wires could clearly be seen.

*Example 2.*—A polyester resin according to Example 1 was coated over a reinforced fabric base of stainless steel wire mesh and glass fiber rovings in which the glass fibers were only interwoven along the warp and coated on one side of the mesh with additional glass fiber rovings aligned with each other and with the woof of the wire mesh. The resulting coated base was then polymerized as described in Example 1 to obtain a similar type product.

*Example 3.*—A reinforced fabric base of one layer of mild steel window screen type wire mesh with two layers on each side of rovings wound around the screen, one layer on each side being parallel to the warp of the screen and the other layer on each side being parallel to the woof of the screen was prepared. This reinforced material base was then preformed into an arc of a cylinder approximately 2 inches high, 8 inches across its base and 1 foot long, and then coated with a resin according to Example 1 and polymerized to produce a rigid structure 3/32 inch thick which would support on the arch a load in excess of 200 pounds. This structure was then subjected to extreme shock by firing a .22 caliber long rifle bullet at a range of 6 feet into the arched surface which resulted in a clean hole through three laminations without fracture and only local disintegration of the fourth glass lamination. Also because of the metal reinforcement in the structure, an ordinary hardened self tapping sheet metal screw was firmly anchored in the surface, and clean holes were drilled into it without fraying or fracture at the edges of the holes.

The reinforced plastic product of this invention may be used in different fields, such as for example: automobile, truck and trailer bodies; furniture, table and counter tops; machine parts in which thermal and electrical insulation may be required as well as high stiffness; pipes and ducts; building construction materials, such as panels, roofs, light diffusers, road signs, doors, booths, and the like; containers such as barrels, trays, boxes, large liquid storage tanks, etc.; articles of apparel, such as safety vests and helmets; radio apparatus including radar antennae, screened radio cabinets, radomes, etc.; airplane parts; sport equipment including metal wire reinforced glass fishing rods, bows and arrows, skis, golf clubs, small boat hulls, and many other uses.

While there is described above the principles of this invention in connection with specific apparatus, it is to be clearly understood that this description is made only by way of example and not as a limitation to the scope of this invention.

What is claimed is:

1. A reinforced plastic product having embedded therein substantially parallelly aligned reinforcing interwoven metal wires and glass fibers, said glass fibers having lower coefficients of thermal expansion than said wires, and a polymerized thermosetting resinous material completely surrounding said fibers and wires, said resin having the property of contracting at its heat of polymerization to hold said wires under stress in said product.

2. A reinforced plastic sheet product comprising: a thermosetting resin, and a reinforcing base of two different interwoven filature materials including substantially parallelly aligned metal wires and glass fibers imbedded in said resin.

3. A product according to claim 2 wherein said wires are steel.

4. A product according to claim 2 wherein said glass fibers are yarns.

5. A product according to claim 2 wherein said glass fibers are rovings.

6. A product according to claim 2 wherein said glass fibers and metal wires are interwoven into a fabric.

7. A product according to claim 2 including a coating of short random glass fibers on at least one side of said sheet.

8. A method of producing a reinforced plastic product comprising: parallelly interweaving a metallic with a glass fibrous material to form a fabric, impregnating said fabric with a non-polymerized resinous material, and polymerizing said resinous material on said fabric at an elevated temperature to form a solid plastic product and to place said metalic fibers under stress in said product.

9. A method according to claim 8 including coating said polymerized product with a layer of randomly placed short glass fibers coated with said resin, and polymerizing said coating in situ.

10. A method according to claim 8 including preforming said fabric before impregnating it with said resinous material.

References Cited in the file of this patent

UNITED STATES PATENTS

| | | |
|---|---|---|
| 1,457,892 | Blackwelder | June 5, 1923 |
| 2,010,711 | Bergman | Aug. 6, 1935 |
| 2,120,270 | Tucker | June 14, 1938 |
| 2,123,275 | Dym | July 12, 1938 |
| 2,366,025 | Hall | Dec. 26, 1944 |
| 2,372,983 | Richardson | Apr. 3, 1945 |
| 2,437,799 | Yorke | Mar. 16, 1948 |
| 2,514,429 | Waugh | July 11, 1950 |
| 2,517,698 | Muskat | Aug. 8, 1950 |
| 2,574,849 | Talalay | Nov. 13, 1951 |
| 2,604,425 | Batchelor et al. | July 22, 1952 |
| 2,670,554 | Francis | Mar. 2, 1954 |

FOREIGN PATENTS

| | | |
|---|---|---|
| 518,074 | Great Britain | Feb. 16, 1940 |
| 609,150 | Great Britain | Sept. 27, 1948 |